United States Patent [19]
Woodward et al.

[11] Patent Number: 6,079,861
[45] Date of Patent: Jun. 27, 2000

[54] OPTICAL SWITCH FOR DENTAL/MEDICAL LIGHT GUIDE

[75] Inventors: Benjamin Woodward, Santa Clara; Steve Mortensen, Redwood City; Satish Herekar, Palo Alto; Joseph Shaffer, Fremont, all of Calif.

[73] Assignee: Lares Research, Chico, Calif.

[21] Appl. No.: 08/799,325

[22] Filed: Feb. 13, 1997

[51] Int. Cl.[7] .................................................. F21V 8/00
[52] U.S. Cl. ..................... 362/552; 362/573; 362/276; 362/228; 362/321; 362/282; 362/802; 362/572
[58] Field of Search ............................. 362/32, 276, 802, 362/228, 229, 235, 251, 319, 321, 322, 323, 324, 109, 280, 282, 284, 119, 572, 573, 552, 555; 433/29, 215

[56] References Cited

U.S. PATENT DOCUMENTS

| | | |
|---|---|---|
| 4,366,529 | 12/1982 | Takahashi et al. ........................ 362/32 |
| 4,385,344 | 5/1983 | Gonser . |
| 4,415,952 | 11/1983 | Hattori et al. ............................ 362/32 |
| 4,509,508 | 4/1985 | Tsukaya .................................... 362/32 |
| 5,408,550 | 4/1995 | Lefevre et al. . |

*Primary Examiner*—Thomas M. Sember
*Attorney, Agent, or Firm*—John P. O'Banion

[57] ABSTRACT

A system for supplying optical power uses an optical switch or shutter at the handpiece. The optical switch is positioned between an open light-transmitting position and a closed light-reflecting position. A detector at the base of the system can be used to detect the position of the optical shutter in some situations. This can be used to control the operation of a high-intensity light source. In this manner, the system can be controlled at the handpiece without using electrical power at the handpiece.

23 Claims, 3 Drawing Sheets

OPTICAL SWITCH FOR DENTAL/MEDICAL LIGHT GUIDE

BACKGROUND OF THE INVENTION

This device relates generally to devices for supplying optical light energy such as dental curing lamps, or the like.

An example of a dental curing lamp is given in Gonser U.S. Pat. No. 4,385,344 entitled "Visible Light Apparatus for Curing Photo-Curable Compositions." This patent describes the use of a halogen lamp which is filtered to supply light in the range of 400–700 nanometers. The light is focused into a light guide which transmits the light to a handpiece. The light is emitted from the handpiece to cure photo-curable materials, such as dental sealant, dental filling materials, dental adhesives and the like. The electrical switch at the handpiece controls the operation of the halogen lamp.

It is desired to have an improved system for supplying optical power.

SUMMARY OF THE INVENTION

An optical switch at a handpiece of a light guide allows for control of a high-intensity optical light source at the handpiece without using electrical energy in the handpiece.

The presence of electrical energy in a patient-contact device presents some degree of hazard, for which safety measures may be somewhat expensive or difficult in some way.

An optical switch at the handpiece does not require the use of electrical energy. The system can sense the position of the optical switch and then take appropriate action based on this information.

For example, when the optical shutter is closed, more light will reflect back to the detector. The increase in the reflected light at the detector can be interpreted by the processor as indicating that the optical switch is in the closed position and the high-intensity light source should be turned off.

A low-intensity light source can also be used along with the present invention. Even when the high-intensity light is off, the detector can detect the change (decrease) in the reflected light energy off of the shutter from the low-intensity light source. The microprocessor can turn on the high-intensity light source when the optical shutter is opened.

The present invention can also use a timer at the microprocessor to automatically turn off the high-intensity light source.

The optical shutter is preferably a thin metal piece such that the gap between the light guide and the handpiece can be kept small. In this way, when the shutter is open, the light is efficiently coupled between the light guide and the handpiece. The optical switch can include a spring or rotary mechanism.

DETAILED DESCRIPTION OF THE PREFERRED EMBODIMENT

Figure 1:
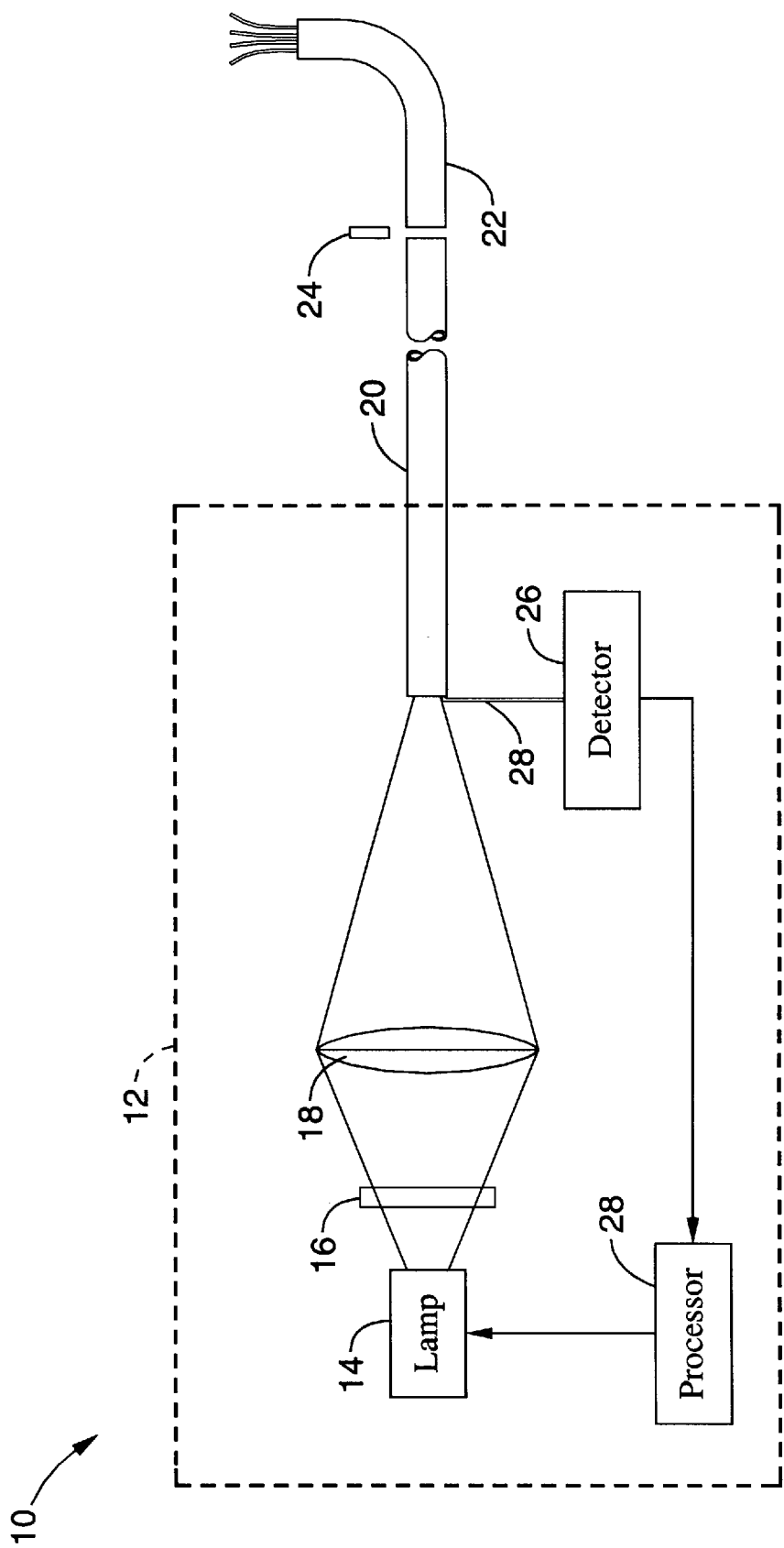
FIG. 1 is a diagram of a preferred embodiment of the present invention showing a high-intensity light source, handpiece and detector.

FIG. 1 is a diagram of a system 10 for supplying optical power of the present invention. A base unit 12 includes a high-intensity light source, such as a lamp 14. A high-intensity light source is defined for this application as a light source which produces light of an intensity greater than that required to act as a signal, such as that used with light-emitting diodes or diode lasers. High-intensity light sources can be used for curing photo-sensitive materials or doing some other action beyond that of merely detecting the position of an optical switch.

Figure 3:
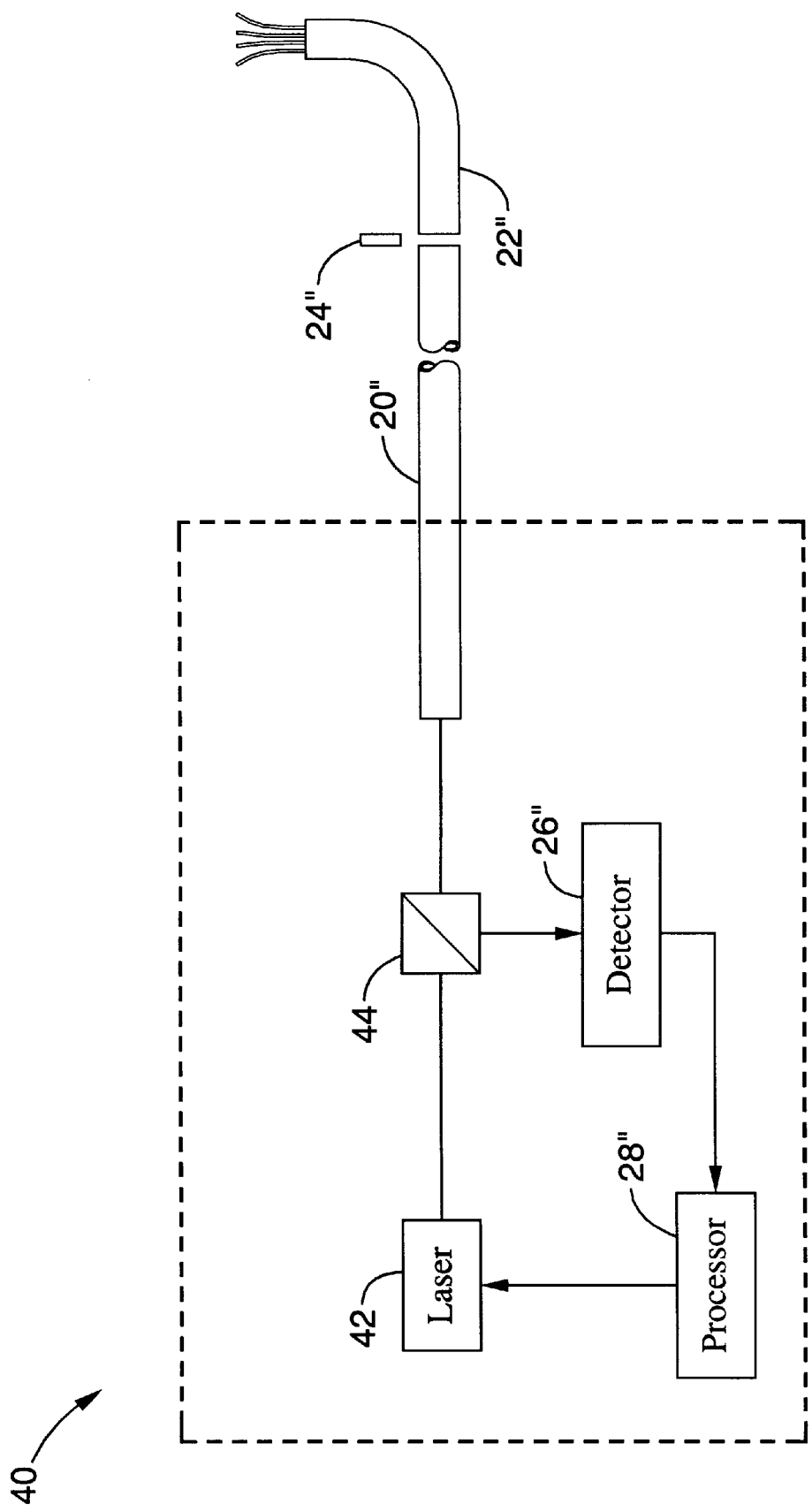
FIG. 3 is another alternate embodiment of the present invention, in which the high-energy light source is a laser and a beam splitter is used.

In a preferred embodiment, the high-intensity light source is a lamp 14, such as a short arc lamp available from ILC Technologies or EG+G. Alternately, the lamp could be a quartz halogen lamp or any other type of lamp for which a remote sensing of the handpiece switch is desired. Alternately, as shown in FIG. 3 below, a laser source could be used. The advantage of lamps over lasers is that the lamps are generally less expensive. In a preferred embodiment, the lamp 14 produces about one watt of energy in the desired wavelength range.

In a preferred embodiment, the lamp energy goes to a filter or filters 16. The light energy is filtered to pass the wavelength range of 420 to 500 nanometers. Optics 18 are used to focus the light energy from the lamp onto the end of the light guide 20.

The light guide 20 in a preferred embodiment is a liquid light guide such as that available from Lumatec of Germany. Alternately, a fiber optic bundle, such as those available from Edmund Scientific, or a single fiber optic, such as that available from Polymicro, could be used. In a preferred embodiment, the light guide 20 is long enough to be conveniently manipulated by the operator. In one embodiment, the optical light guide is about two meters long.

A handpiece 22 is used to receive the optical energy from the light guide 20 and provide it to the desired site. An optical shutter 24 is positioned near the handpiece 22. The optical shutter 24 is preferably a thin piece of metal which can be used to slip in and out of a space between the light guide 20 and the hand-piece 22. The optical shutter 24 is kept thin because it is desired that as much optical energy as possible pass between the light guide 20 and the handpiece 22 when the optical switch 24 is open. In a preferred embodiment, the gap spacing is between 0.013 and 0.017 inches. The optical shutter 24 should be large enough to cover the entire end of the light guide 20. In a preferred embodiment, the light guide 20 is a liquid light guide of one-half centimeter in diameter so the shutter 24 should be at least that size.

The shutter 24 should reflect as much of the energy as possible from the light guide back towards the base when the shutter is closed. In a preferred embodiment, the shutter is ninety percent or greater reflective for visible light energy. The shutter 24 can be spring-activated, rotated or positioned in some other manner between the open and closed positions. When the shutter 24 is in the open position, it is preferably completely out of the gap between the light guide 20 and the hand-piece 22.

A detector 26 in a preferred embodiment is connected by an optical fiber 28 to the base end of the light guide 20. The detector 26 is a photo-detector, which can be used to detect the changes in the reflective light when the shutter 24 is opened and closed. The detector 26 sends a signal to the processor 28 used to control the lamp 14. In a preferred embodiment, the processor 28 has a timer which can time out the high-intensity light source.

TABLE I

| High-Intensity Light Source | Optical Shutter | Detected Energy |
|---|---|---|
| off | open or closed | low |
| on | closed | very high |
| on | open | high |

Table I gives a description of the operation of the system for supplying optical power 10 of FIG. 1. When the high-intensity light switch is off, the detected signal at the detector is low whether the optical shutter is open or closed. Thus, in a preferred embodiment of the system of FIG. 1, the user can turn on the high-intensity light source using a switch at the base or a foot switch. In a preferred embodiment, a timer is used so that high-intensity light is supplied for a predetermined period of time. While the high-intensity light source is on, and the optical shutter open, a signal at the detector is high, due to scattered light. When the optical switch is closed, the signal at the detector jumps to a higher level (very high). This very high level can have an intensity as much as five times greater than the high level detected when the optical shutter is open. The detected signal is sent to the processor which determines that the optical shutter has been closed. The processor then causes the high-intensity light source to turn off.

Figure 2:
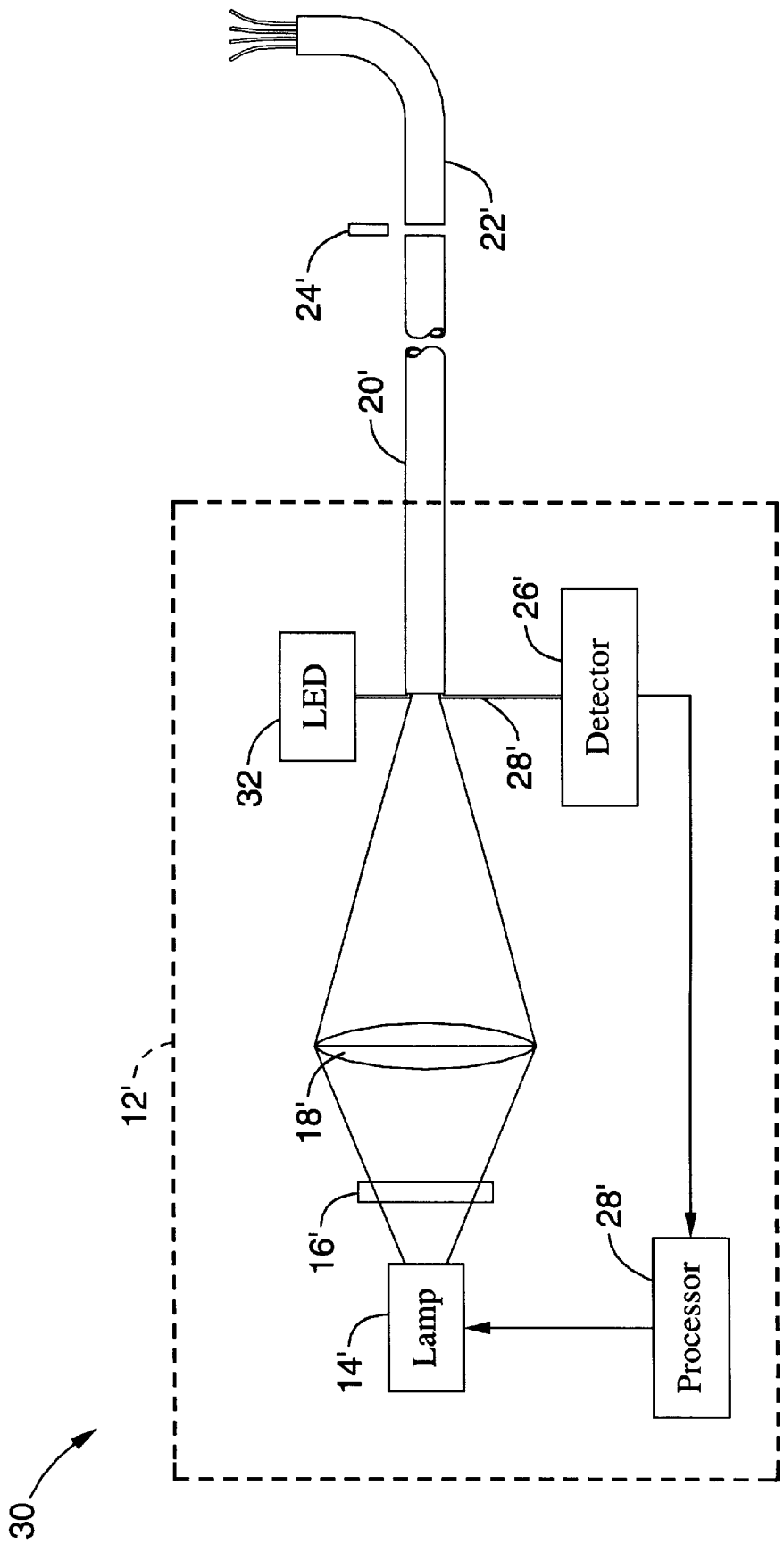
FIG. 2 is a diagram of an alternate embodiment of the present invention adding a low-intensity light source to the embodiment of FIG. 1.

FIG. 2 shows an alternate embodiment of a system for supplying optical power 30. This alternate embodiment uses a low-intensity light source such as a light-emitting diode (LED) 32. The low-intensity light source can alternately be a laser diode or any other low-intensity source of light. In the preferred embodiment, the low-intensity light source has a much lower intensity than the high-intensity light source. The intensity ratio can typically range from 10–1000 to 1.

Table II shows the operation of the alternate embodiment of FIG. 2.

TABLE II low-intensity light source always on

| High-Intensity Light Source | Optical Shutter | Detected Energy |
|---|---|---|
| off | closed | moderate |
| off | open | low |
| on | closed | very high |
| on | open | high |

In the alternate embodiment of FIG. 2, the low-intensity light source always remains on. Thus, the position of the optical shutter can be determined even when the high-intensity light source is off. Note that, when the high-intensity light is off, and the optical shutter is closed, a moderate level of light is detected by the detector 26. When the high-intensity light is off and the optical shutter open, the detected energy drops down to a low level.

In one embodiment, the processor can cause the high-intensity energy source 14' to turn on when the detected energy drops down to a low level. The light can be on for a predetermined time period. If while the high-intensity light is on, the optical shutter is closed, the detected energy will increase from a high level to a very high level. The processor can then cause the high-intensity lamp to turn off. Thus, both the turning on and turning off of the high-intensity light source can be controlled by the optical switch 24' at the handpiece 22'.

In an alternate embodiment, the closing of the optical switch can cause the high-intensity lamp to turn on. The optical switch can then be opened to allow the light energy to exit the handpiece. The high-intensity lamp operation can be timer-controlled from the opening of the optical switch. If the optical switch is closed again while the high-intensity light is on, the high-intensity power supply can be turned off.

FIG. 3 is an alternate embodiment of a system for supplying optical power 40 using a laser 42 as the high-intensity light source. The laser 42 can be connected through a beam splitter 44 to the light guide 20". The beam splitter 44 causes some of the reflected light from the optical shutter 24" to be detected at the detector 26". In the laser-based systems, it may be more useful to an use an optical fiber as the light guide 22". The system 40 could also use a low-intensity light source (not shown).

The system for supplying optical power can be used for embodiments such as industrial curing or the setting of adhesives. The system for supplying optical power of the present invention is most useful for use in dental or medical applications, because the lack of an electrical switch in the handpiece is most advantageous when used in these applications. Dental/medical applications can include dental composite curing as discussed above, therapeutic light delivery, and the like.

Various details of the implementation and method are merely illustrative of the invention. It will be understood that various changes in such details may be within the scope of the invention, which is to be limited only by the appended claims.

What is claimed is:

1. A system for supplying optical power comprising:
   a base including a high-intensity light source;
   a light guide operably connected to the high-intensity light source, said light guide having a base end;
   a low-intensity light source operably connected at the base end of the light guide;
   an optical power supplying head operably connected to the light guide, the power supplying head having an optical shutter attached thereto, the optical shutter being operable between an open, optical-power-supplying position and a closed, light-reflecting position; and
   a detector adapted to detect light reflected from the shutter.

2. The system of claim 1, further including a processor operably connected to the detector to help control the high-intensity light source.

3. The system of claim 2, wherein the processor is adapted to turn off the high-intensity power supplying source when the detector detects a predetermined level of reflected light indicating the shutter being in the closed position.

4. The system of claim 1, further comprising an optical fiber operably connecting the light guide and the detector.

5. The system of claim 1, wherein the system is a dental curing lamp.

6. The system of claim 1, further comprising a processor operably connected to the detector, the processor adapted to determine the position of the shutter from the detected light.

7. The system of claim 6, wherein the processor is adapted, when the low-intensity source is on and the high-intensity power source is off, to turn on the high-intensity power supplying source when the detector detects such a low level of light indicating the shutter being in the open position.

8. The system of claim 6, wherein the processor is adapted to turn off the high-intensity power supplying source when the detector detects a predetermined level of reflected light indicating the shutter being in the closed position.

9. The system of claim 6, wherein the processor is adapted to turn on the high-intensity power supplying source when the detector detects a predetermined level of reflected light indicating the shutter being in the closed position.

10. The system of claim 1, wherein the low-intensity light source comprises a light-emitting diode.

11. The system of claim 1, wherein the high-intensity light source comprises a lamp.

12. The system of claim 11, wherein the high-intensity light source further comprises a filter.

13. The system of claim 1, wherein the high-intensity light source comprises a laser.

14. The system of claim 1, further comprising a beamsplitter.

15. The system of claim 1, wherein the light guide comprises a liquid light guide.

16. The system of claim 1, wherein the light guide comprises an optical fiber.

17. A dental curing lamp comprising:
- a base including a high-intensity light source, the light source being suitable for curing dental fixtures;
- a light guide operably connected to the high-intensity light source, said light guide having a base end;
- a low-intensity light source operably connected at the base end of the light guide;
- an optical power supplying head operably connected to the light guide, the power supplying head having an optical shutter attached thereto, the optical shutter being operable between an open, optical-power-supplying position and a closed, light-reflecting position, wherein the optical power supplying head is adapted to use no electrical energy; and
- a detector adapted to detect light reflected from the shutter.

18. The dental curing lamp of claim 17, wherein the dental curing lamp supplies some energy in a wavelength of 420–500 nm.

19. The dental curing lamp of claim 17, further including a processor operably connected to the detector to help control the high-intensity light source.

20. The dental curing lamp of claim 17, wherein the high-intensity light source comprises a laser.

21. The dental curing lamp of claim 17, further comprising a beam splitter.

22. A system for providing optical power comprising:
- a base including a high-intensity light source and a low-intensity light source;
- a light guide operably connected to the high-intensity light source and to the low intensity light source;
- an optical power supplying head operably connected to the light guide, the power supplying head having an optical shutter attached thereto, the optical shutter being operable between an open, optical-power-supplying position and a closed, light-reflecting position; and
- a detector adapted to detect light reflected from the shutter.

23. A system for providing optical power comprising:
- a base including a high-intensity light source;
- a light guide operably connected to the high-intensity light source;
- an optical power supplying head operably connected to the light guide, the power supplying head having an optical shutter attached thereto, the optical shutter being operable between an open, optical-power-supplying position and a closed, light-reflecting position;
- a detector adapted to detect light reflected from the shutter; and
- a beamsplitter operably connected to the high intensity light source and to the detector.

* * * * *